Dec. 3, 1968  R. P. LEROUX  3,414,153
MULTICELLULAR CONTAINERS OR ENCLOSURES
Filed Aug. 1, 1966  15 Sheets-Sheet 1

INVENTOR
René P. Leroux
Curtis, Morris and Safford
Attorneys

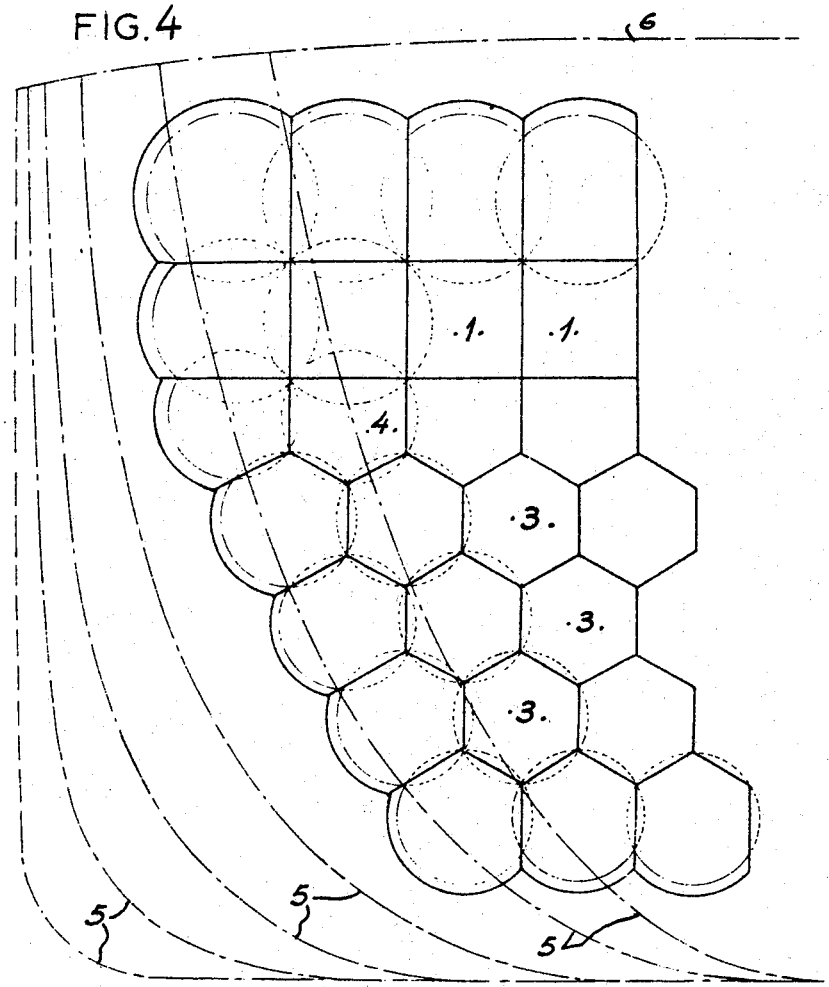

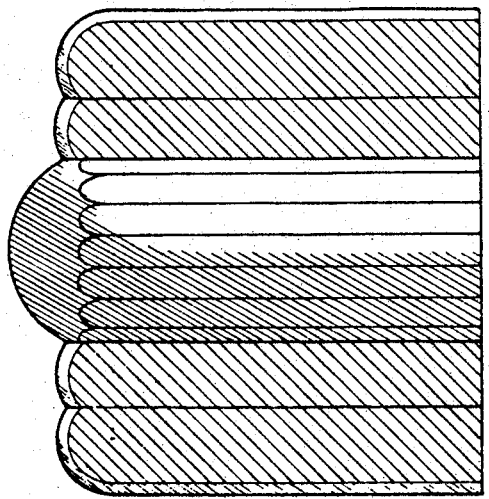
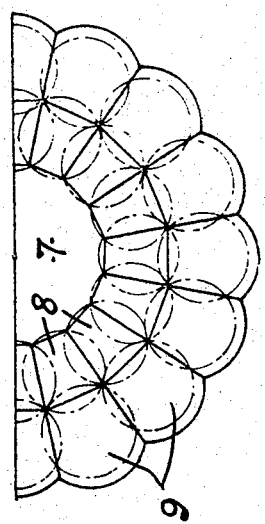
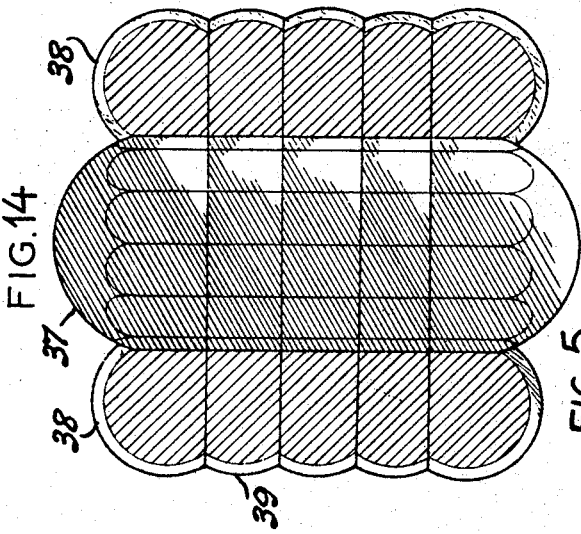
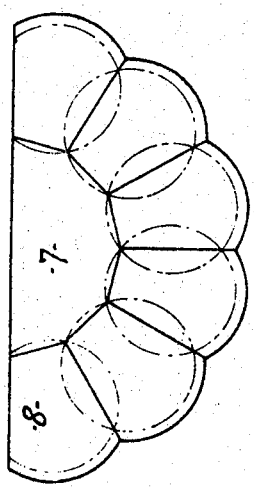

Dec. 3, 1968     R. P. LEROUX     3,414,153
MULTICELLULAR CONTAINERS OR ENCLOSURES
Filed Aug. 1, 1966     15 Sheets-Sheet 4
FIG.7
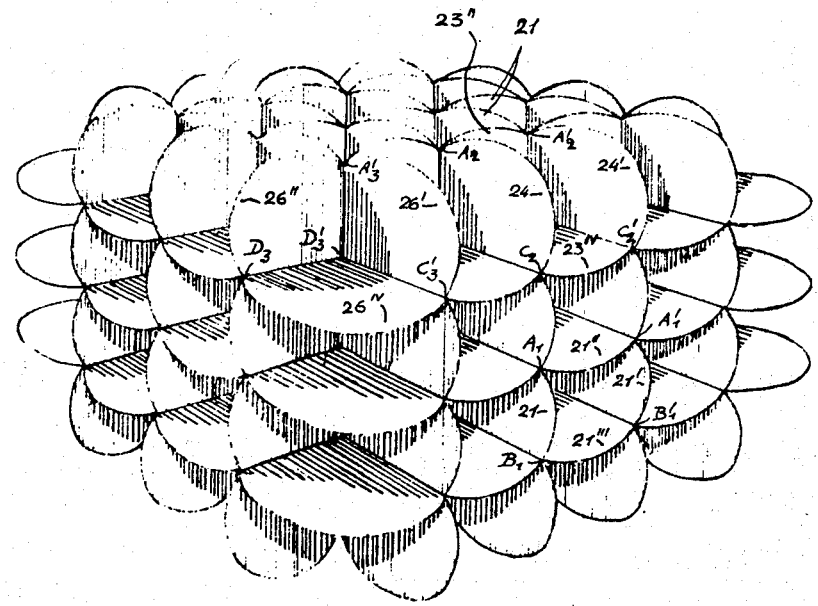
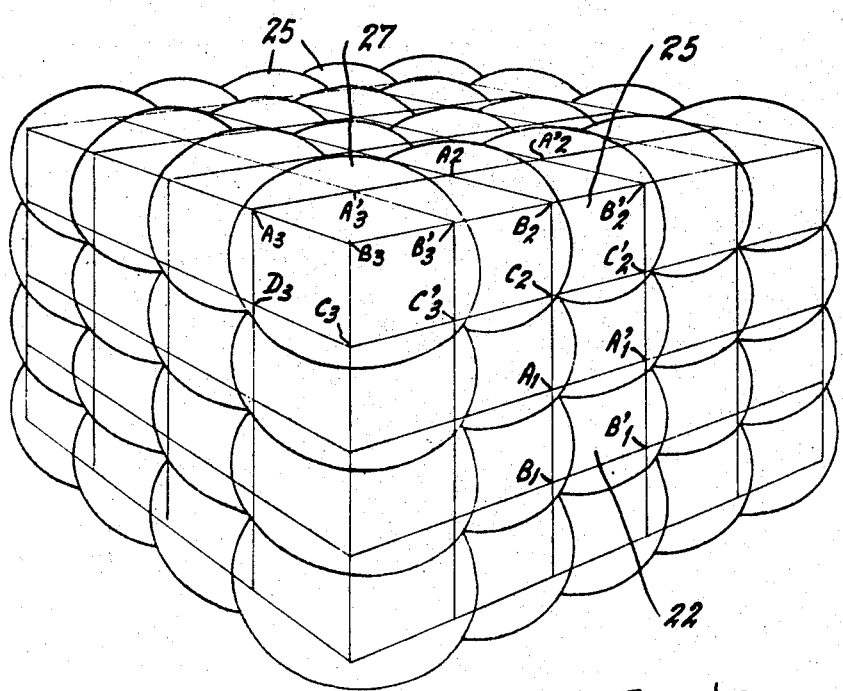
FIG.8
INVENTOR
René P. Leroux
Curtis, Morris and Safford
Attorneys Dec. 3, 1968    R. P. LEROUX    3,414,153
MULTICELLULAR CONTAINERS OR ENCLOSURES
Filed Aug. 1, 1966    15 Sheets-Sheet 5

INVENTOR
RENE P. LEROUX

INVENTOR
René P. LeRoux

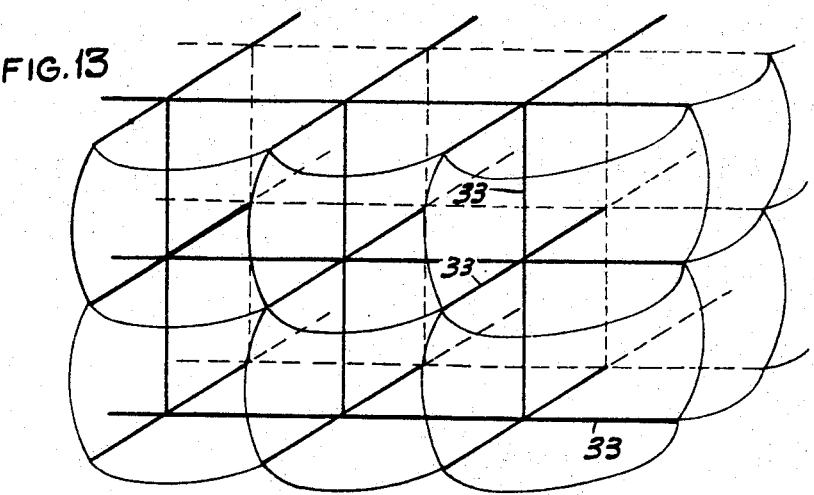
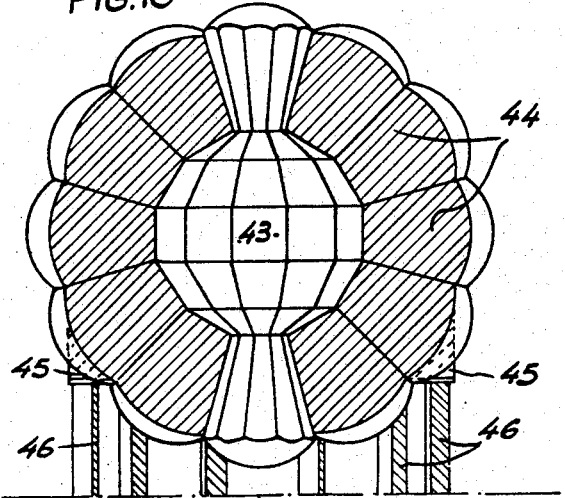
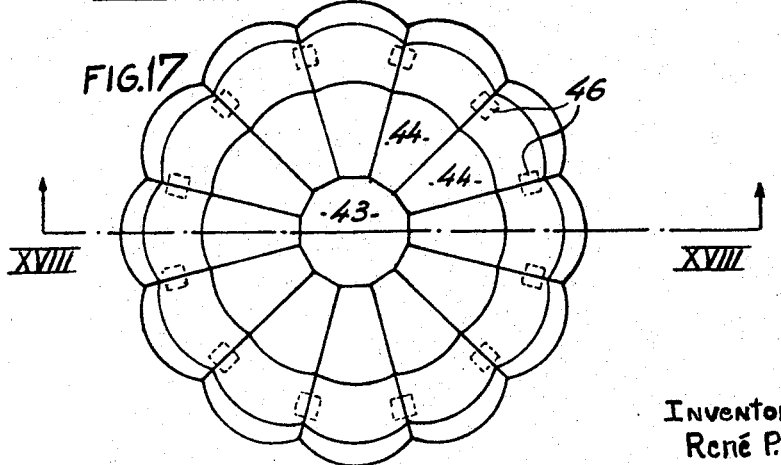

Dec. 3, 1968    R. P. LEROUX    3,414,153
MULTICELLULAR CONTAINERS OR ENCLOSURES
Filed Aug. 1, 1966    15 Sheets-Sheet 8
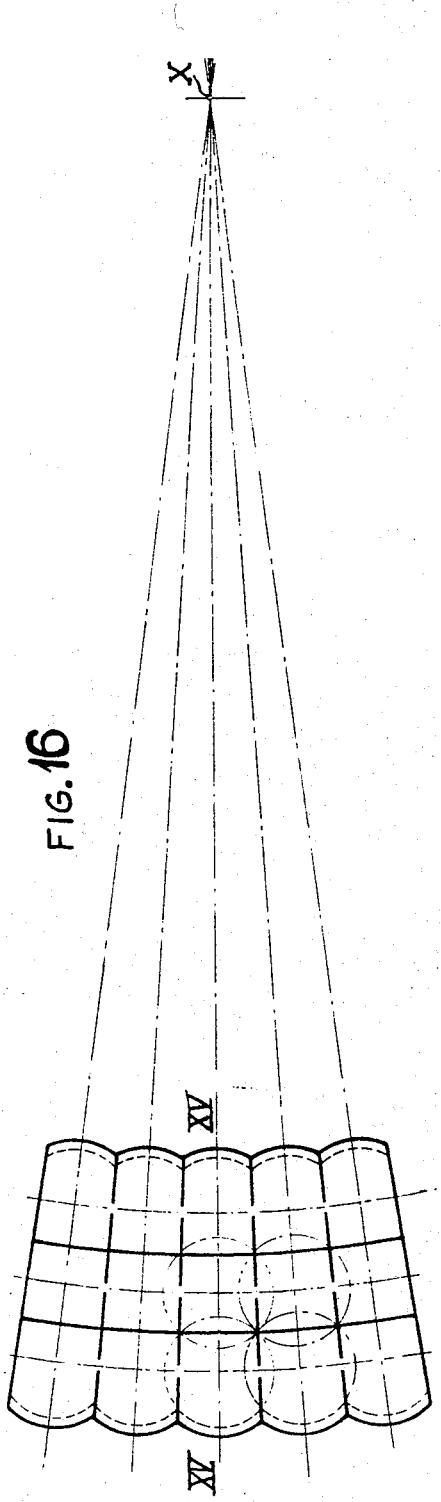
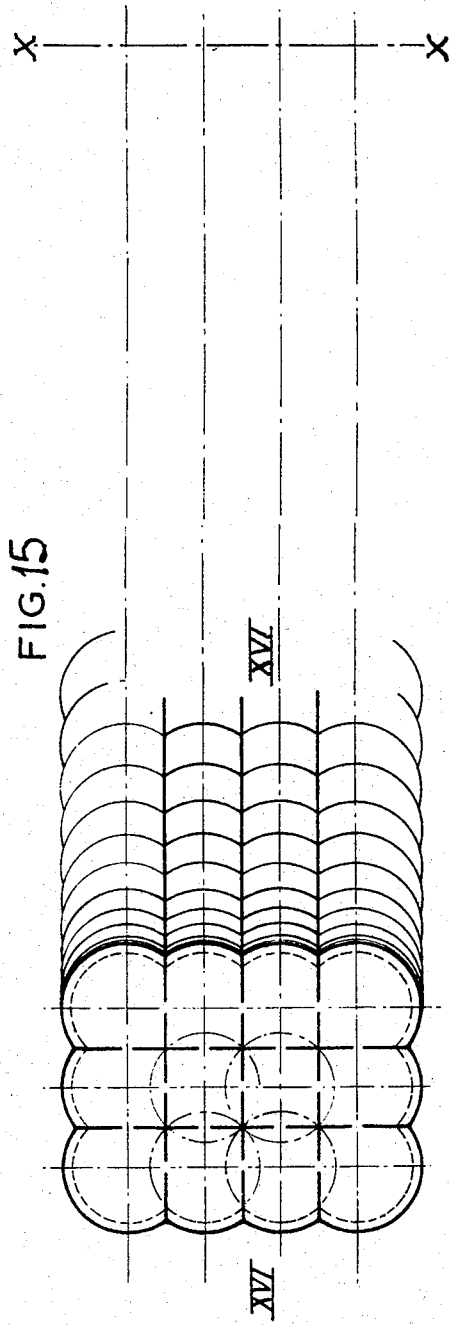
INVENTOR
RENE P. LEROUX

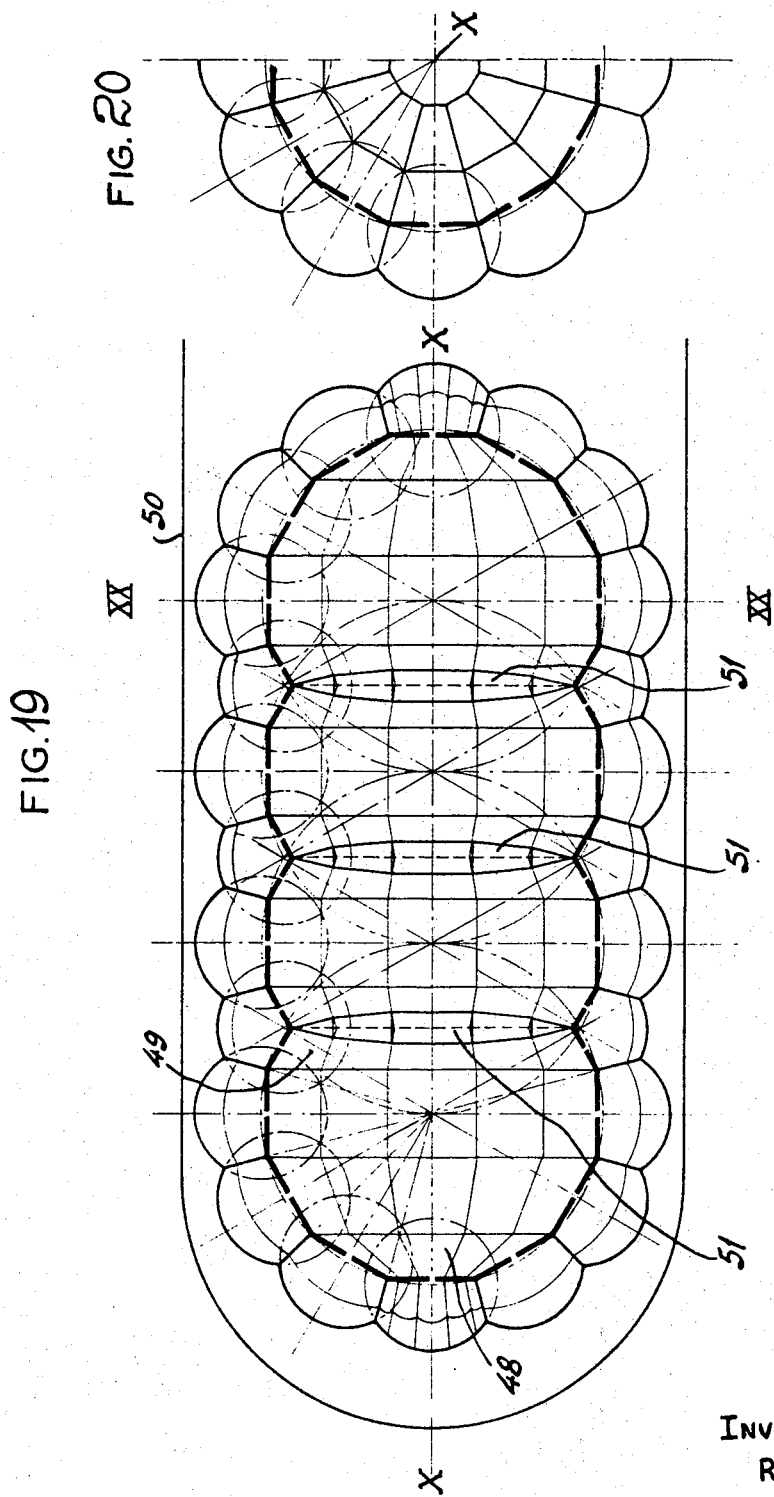

Inventor
René P. Leroux
Curtis, Morris and Safford
Attorneys

Dec. 3, 1968   R. P. LEROUX   3,414,153
MULTICELLULAR CONTAINERS OR ENCLOSURES
Filed Aug. 1, 1966   15 Sheets-Sheet 11
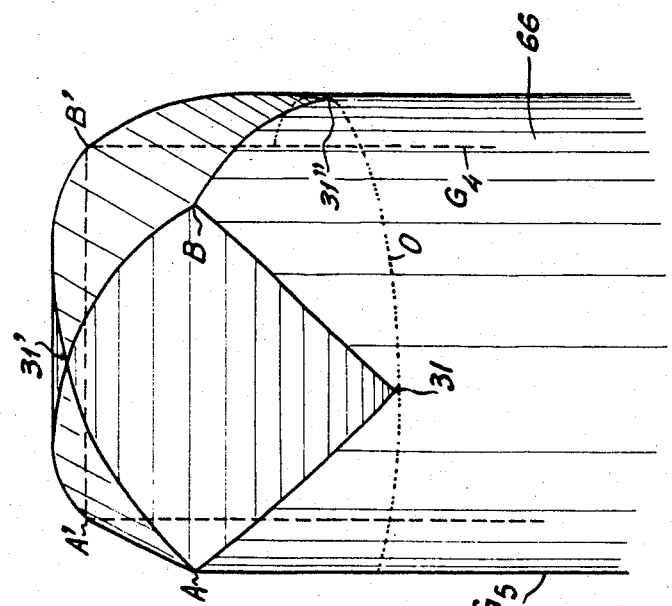
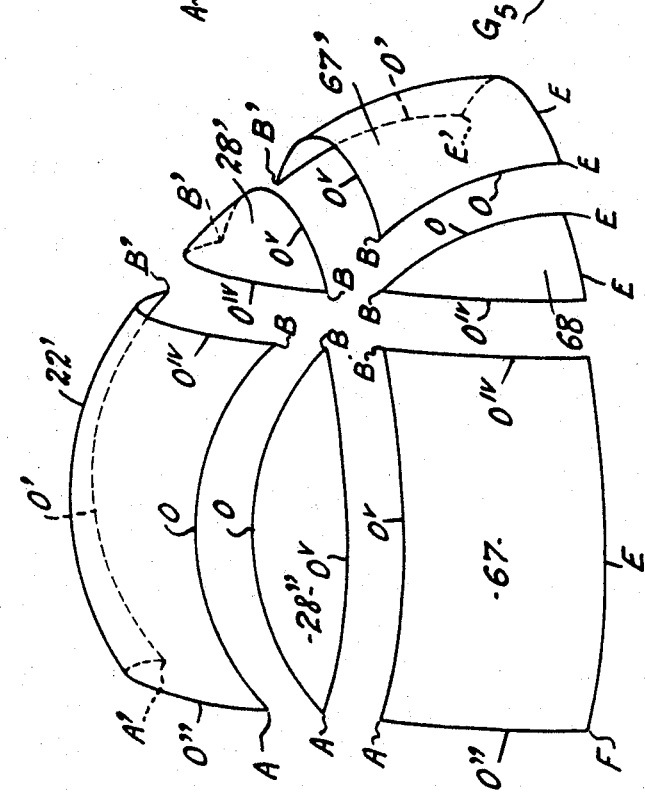
INVENTOR
RENE P. LEROUX Dec. 3, 1968    R. P. LEROUX    3,414,153
MULTICELLULAR CONTAINERS OR ENCLOSURES
Filed Aug. 1, 1966    15 Sheets-Sheet 12

INVENTOR
René P. Leroux
Curtis, Morris and Safford
Attorneys

Dec. 3, 1968  R. P. LEROUX  3,414,153
MULTICELLULAR CONTAINERS OR ENCLOSURES
Filed Aug. 1, 1966  15 Sheets-Sheet 13
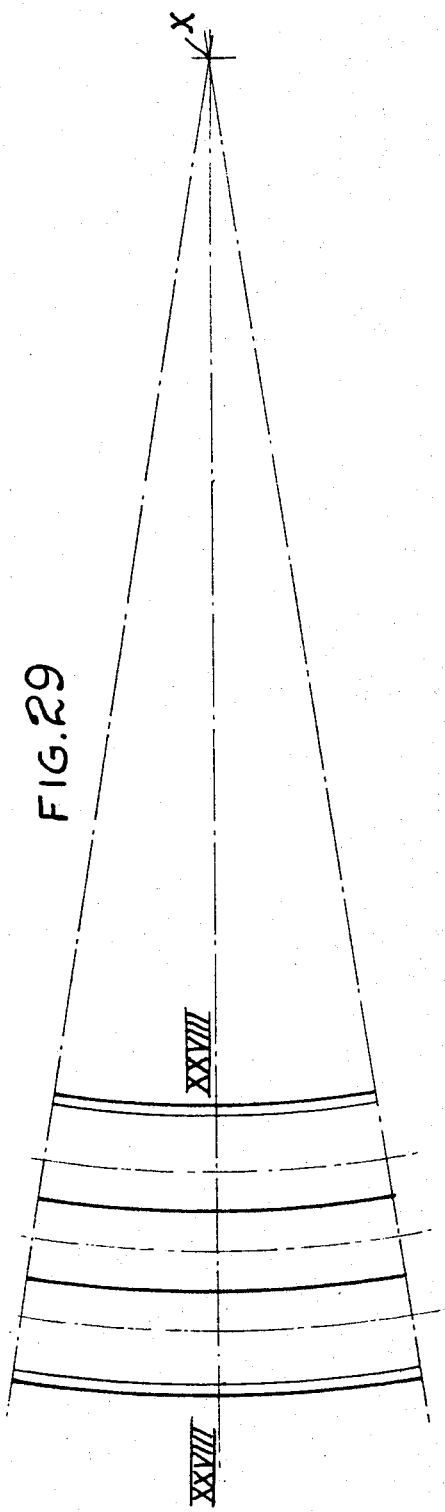
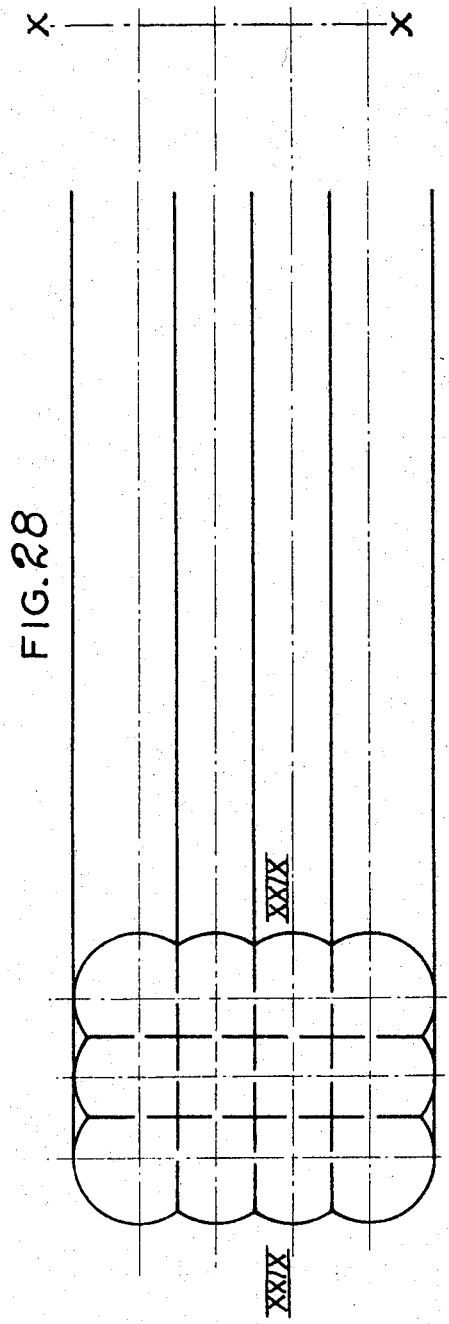
INVENTOR
RENE P. LEROUX

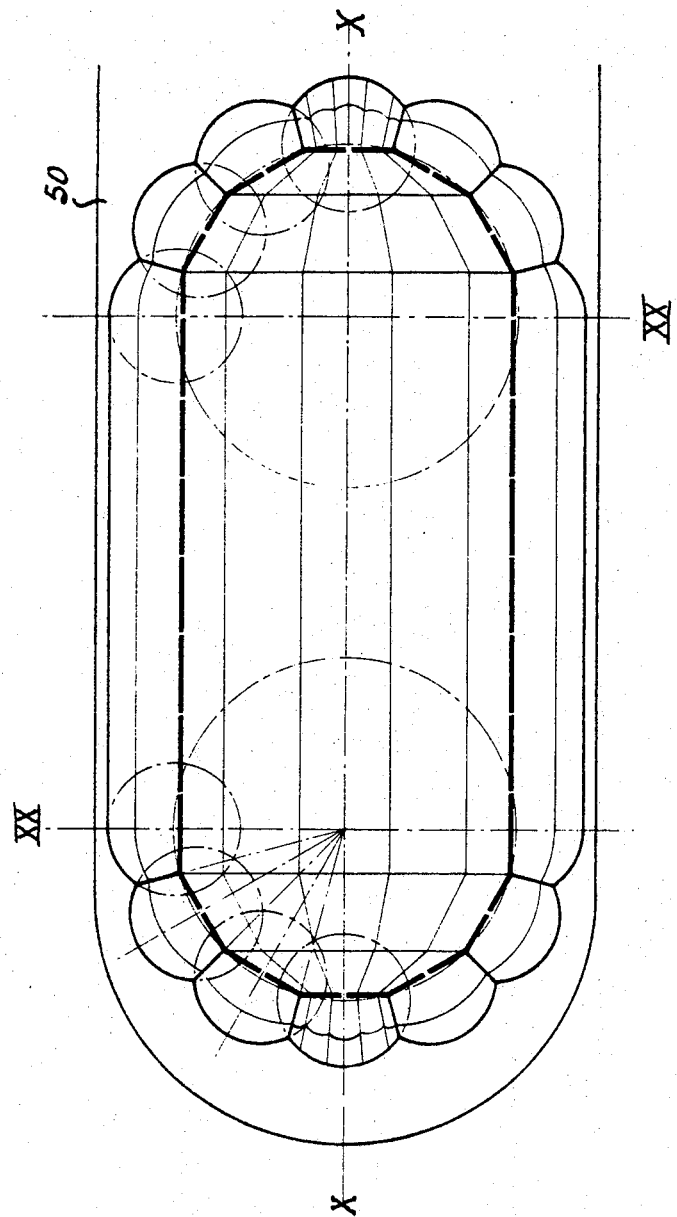

Dec. 3, 1968  R. P. LEROUX  3,414,153
MULTICELLULAR CONTAINERS OR ENCLOSURES
Filed Aug. 1, 1966  15 Sheets-Sheet 15

Inventor
René P. Leroux
Curtis, Morris and Safford
Attorneys

United States Patent Office 3,414,153
Patented Dec. 3, 1968

3,414,153
MULTICELLULAR CONTAINERS OR ENCLOSURES
René P. Leroux, 23 Boulevard Jules Verne,
Nantes, France
Filed Aug. 1, 1966, Ser. No. 569,287
Claims priority, application France, May 4, 1966
60,146
17 Claims. (Cl. 220—1)

ABSTRACT OF THE DISCLOSURE

Multicellular structures are provided for use as liquid and/or gas storage containers, internal and external pressure withstanding vessels, and the like which are aplexic; that is, non-deformable in the sense that any small flexing or movement of the walls thereof from pressure forces is equally distributed throughout each small individual portion of the entire wall structure and supporting internal structures so that the entire vessel or container retains substantially the same outline as it was designed with no localized deformations resulting from the said pressure forces. This is achieved by constructing the container or vessel structures with at least the outer walls thereof of spherical and/or cylindrical surfaces or substantially spherical and/or cylindrical surfaces and with the internal supporting structure following the same lines of curvature as the wall structures and/or the lines of intersection thereof so that the entire internal space of the vessel is occupied or covered without overlap by the placement of said internal structures by the exact method of following the outline of layers of polyhedrons inscribed in imaginary spheres drawn between two normal sections of said structure or vessel in which a perfect carrelage of polygons can be drawn which are perfectly inscribable in a circle with said polygons in said sections forming faces of said polyhedrons on opposite sides thereof at said sections and with the free faces thereof being curved surfaces of substantially constant mean curvature. In addition, said internal structures may be either generally solid partitions forming said polyhedrons or strut-like structures outlining said polyhedrons with the design of the sections of the struts being determined by the partitions they replace so as to maintain an equilibrium throughout the entire structure with respect to the ability of each small portion thereof to withstand equally the same degree of said pressure forces.

---

This invention relates to multicellular structures for use as containers or enclosures and, more particularly, to such structures having at least the walls thereof formed at least partially by portions of spherical or pseudo-spherical surfaces and in a manner to be "aplexic" or "quasiaplexic" under uniform pressure.

In connection herewith, the expression "aplexic" is to be understood as describing a structure such that, under a certain distribution of forces, the internal forces to which the structure is submitted as a result of external forces are those forces contained in the plane of the plane surfaces of the structure or in planes tangent to curved surfaces of the structure. That is, the form of an aplexic surface does not change under internal pressures, only the dimensions thereof. Cancellation of shearing forces and resulting moments of force at each point provides the equilibrium of the system or structure, which is only submitted to expanding effects from internal forces and proportional to such forces at each point. If care is taken to proportion or select the thickness of metal or other materials from which the structure is made to these forces, the deformations in the system or structure can only be uniformly distributed or homothetic, and the tensions on the metal uniform at all points thereover, thus to assure the best utilization of the metal or other material from which the structure is made.

That is, structures such as containers or enclosures which are truly aplexic and in which the thicknesses of the enveloping metal are exactly calculated to assure such proportionality of internal forces provide the situation where, for a given tensile strength and weight of metal, a maximum volumetric capacity can be enclosed. Stated otherwise, providing a truly aplexic envelope for enclosing a given volume permits the utilization of a minimum weight of metal to withstand a given external/internal pressure differential condition. Such structures, particularly as developed in accordance herewith, are particularly applicable to a wide variety of uses such as, for example, storage tanks or reservoirs on land, on sea, or in the air, hulls or shells or other enclosures for rockets, submarines, space vehicles, etc.

The rule for determining the thicknesses of metal (of a given tensile strength) is that the product, at each point on the surface, of the thickness of the exterior surface and the median curvature (i.e., $1/R1+1/R2$ where R1 and R2 are the principal radii of curvature) equals the ratio $P/F$ of the pressure to the admissible tensile strength. Thus, if it is desired to obtain or utilize a constant thickness, surfaces having constant median curvatures should be used (such as those formed by soap bubbles). As will be understood, the most simple of such forms are spheres (where the thickness-pressure-radius-force formula may be represented as $T=PR/2F$) and cylinders $(T=PR/F)$. With multicellular construction, the thicknesses of the plane partitions resulting from intersections of spheres or cylinders with parallel axes are given, respectively, by the same formulas in which the value for the radius (R) is replaced by the distance between centers of spheres or axes of parallel cylinders. Thus, as will be understood, the calculations for gauging the thickness of metal skins or outer shells for such aplexic structures or containers is both quite simple and quite precise.

When the foregoing is applied to structural containers or enclosures developed from intersecting spheres or parallel cylinders, a wide variety of applications and shapes and volumetric capacities are provided in accordance herewith while still retaining the advantages of utilizing a minimum weight of metal for enclosing a maximum volume even when, for other reasons, a particular shape of the structure or the enclosed volume may be exceedingly complex. For example, useful reference may be made to Patent 3,004,509 of Oct. 17, 1961, Patent 3,092,063 of June 4, 1963, Patent 3,071,094 of Jan. 1, 1963, and co-pending application S.N. 269,542 filed Apr. 1, 1963, now abandoned, all as disclosing various container or enclosure structures of an aplexic nature but, otherwise, of relatively simple form as being constituted by a small number of cylindrical or prismatic cells and particularly disclosed as relating to the construction of vessels for transporting liquified gases, which prior patents and applications are readily contrasted with the disclosure herein as relating to structures having a much larger number of individual cells as explained in more detail below, which cells are generally polyhedral with plane and/or curved faces constructed on polygons having straight or curved sides.

It has been found in accordance herewith, for example, that multiplying or increasing the number of such cells (cylindrical or other shapes) achieves a result where the weight of plane surfaces of such polyhedrons exceeds preponderantly the weight of the curved surfaces thereof, all of which results in a double advantage from the point of view of facility and cost of construction. That is, on the one hand, as will be understood, plane surfaces do not have to be shaped or wrought as do curved surfaces and, on the other hand, increasing the curvature of curved surfaces reduces considerably the thickness thereof and, at the same time, difficulties and costs incident to the forming or shaping, welding, annealing, etc., thereof. Also it has been discovered here, particularly following the aplexic conception or formation of the enclosing structure, that the total weight of multicellular structures in accordance herewith is virtually, if not precisely, the same as the case of a single sphere or cylinder enclosing the same volumetric capacity and arranged to withstand the same pressures.

It is, thus, a principal object of this invention to provide multicellular structures as disclosed and so as to be aplexic or quasi-aplexic under uniform pressure and in which the total weight does not substantially exceed that of spherical or cylindrical solid-wall structures of equivalent volumetric capacity and pressure resistance. A further object of this invention is to provide multicellular aplexic structures which are developed or formed by a large multiplicity of a relatively small number of different elements, each of which can be individually mass produced on a large scale and readily assembled together sequentially to obtain economic and manufacturing advantages notwithstanding the wide variety of sizes and shapes of containers or enclosures which may be desired, whether the finished structures are to be utilized as containers or reservoirs or, on the other hand, such more complex designs as hulls or shells for submarines, rockets, space vehicles, etc.

For convenience here, the various multicellular structures according to this invention may conveniently be explained or defined in terms of a normal section through the structures, itself defined as a perfect carrelage or pattern of polygons which can be inscribed within the circumferences of circles, with the terms "carrelage" or "pattern" being understood in the geometry sense, i.e., as meaning a juxtaposition of polygon areas which exactly cover, without omission or overlapping, a portion of a plane, whether or not such polygons are regular and whether or not they are identical or different from each other.

With the foregoing and additional objects in view, this invention will now be described in more detail, and additional objects and advantages will be apparent from the following description, the accompanying drawings, and the appended claims.

Figure 1:
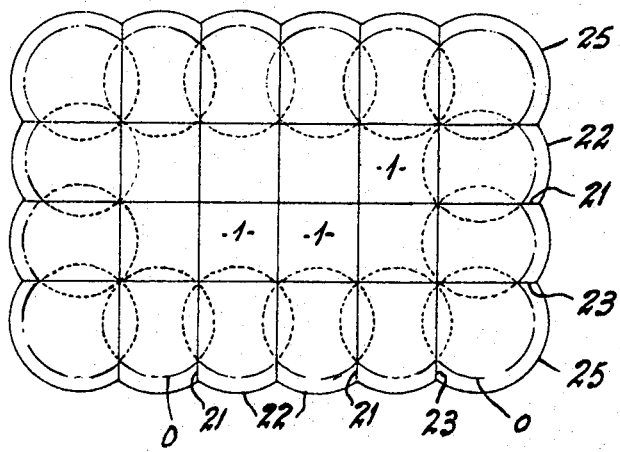
FIG. 1 illustrates a pattern or carrelage of an arrangement embodying and for practising this invention composed of squares and having a generally rectangular form.
Figure 2:
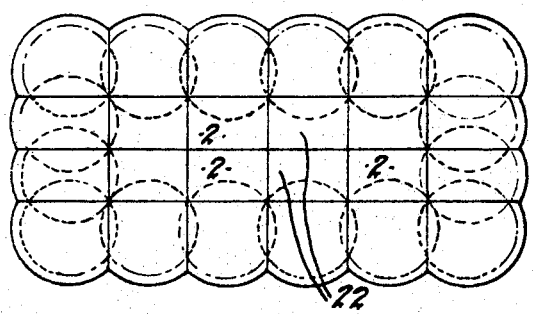
FIG. 2 illustrates a similar pattern of rectangles, also with the whole carrelage having a generally rectangular form.
Figure 10:
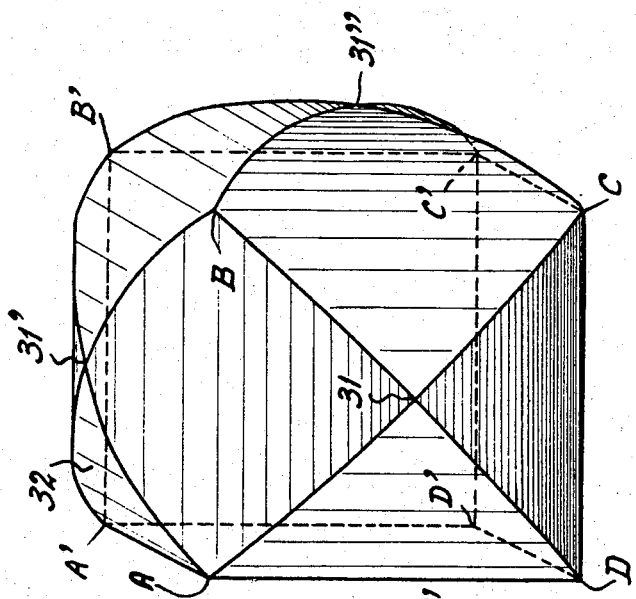
Figure 9:
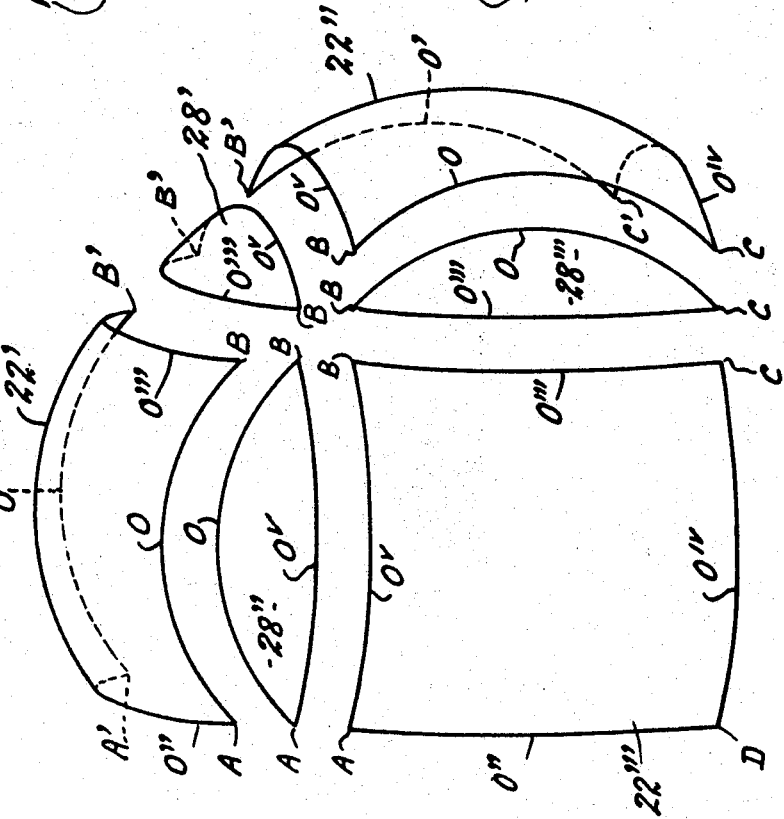
Figure 11:
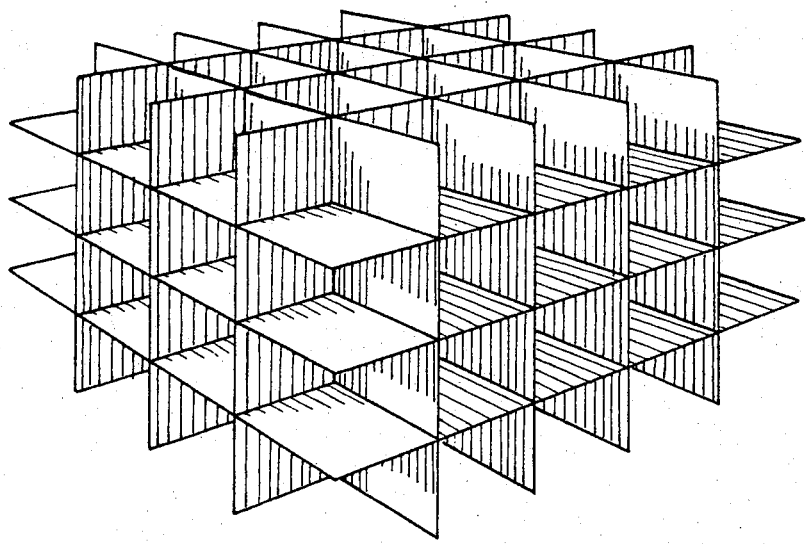
Figure 12:
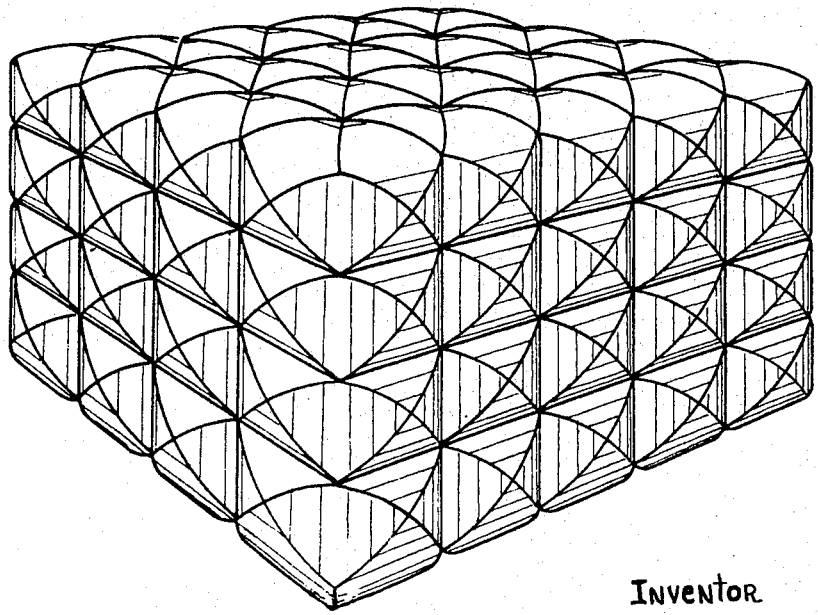
Figure 22:
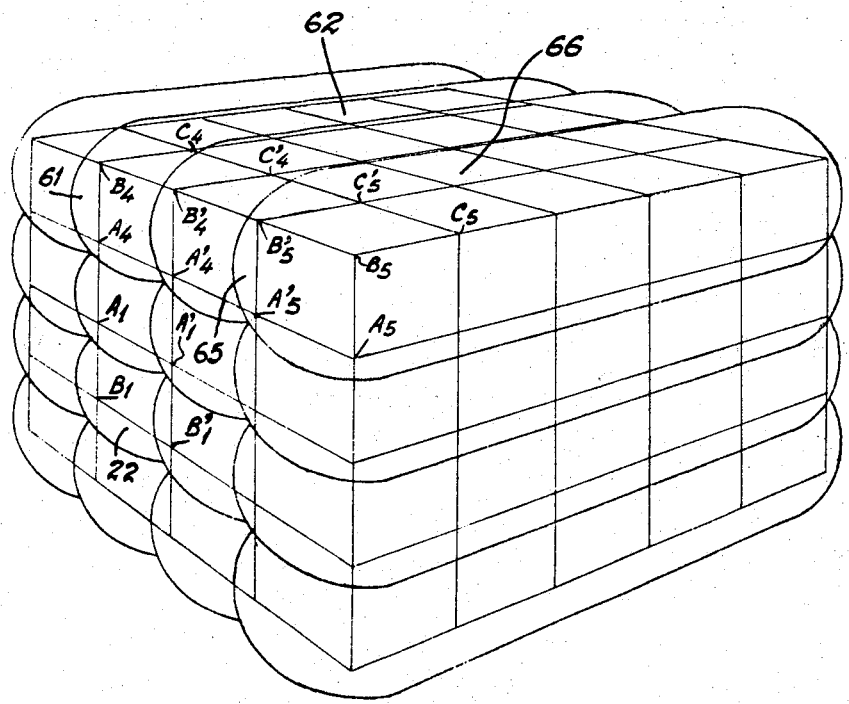
Figure 21:
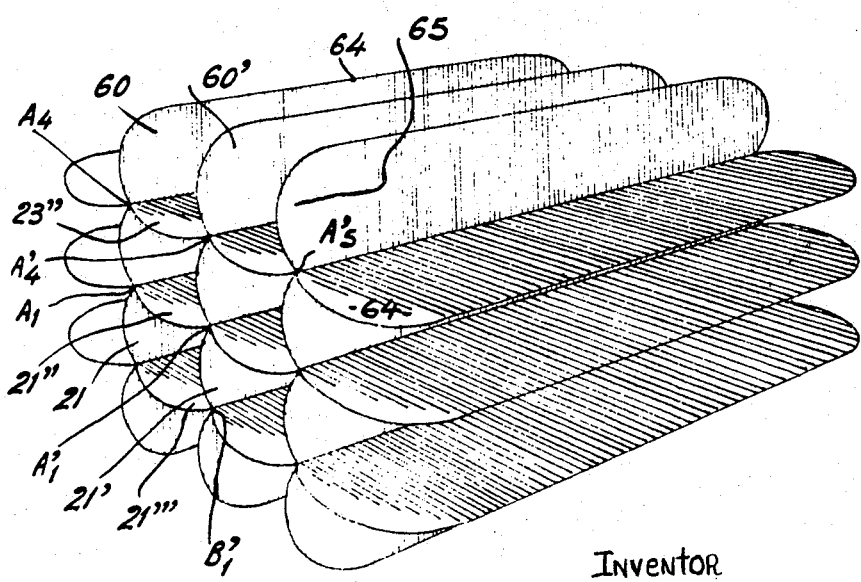
Figure 26:
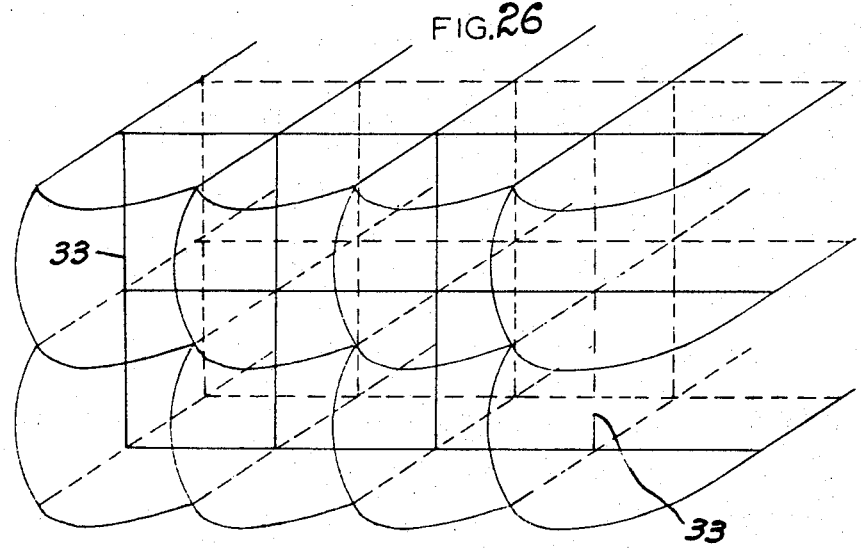
Figure 27:
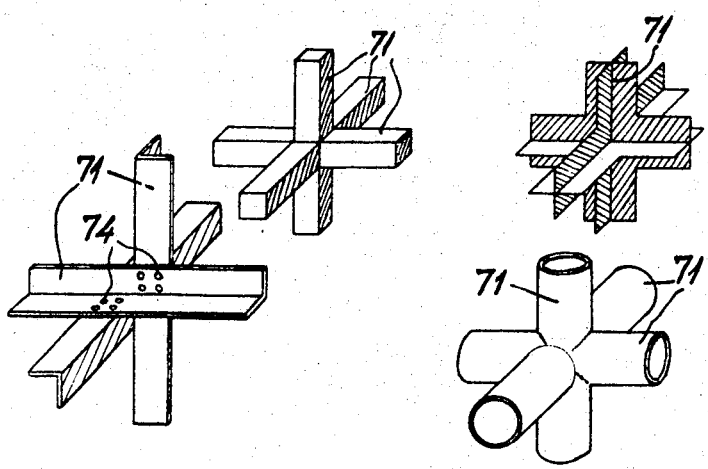
Figure 31:
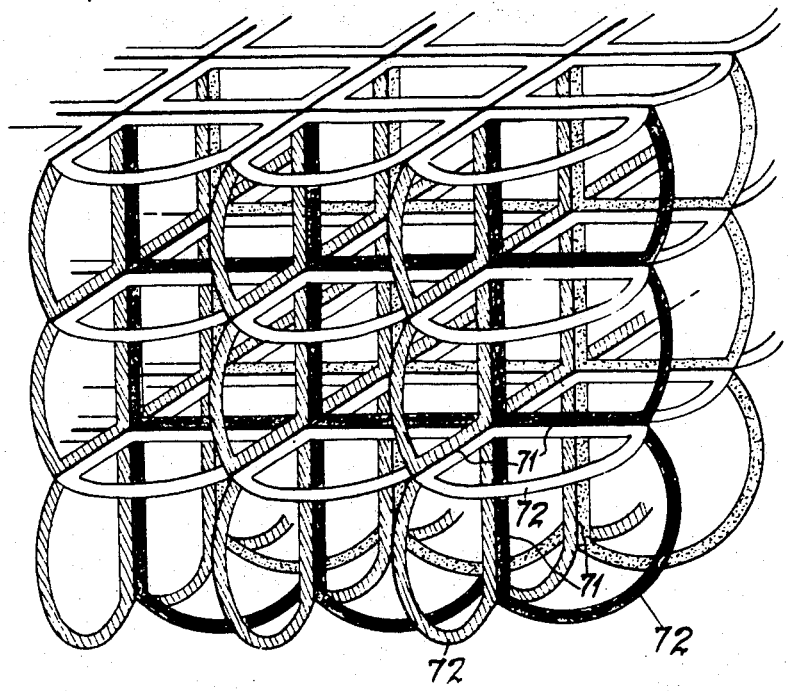
Figure 32:
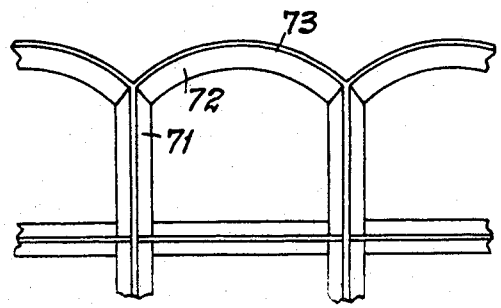

FIG. 4 illustrated another pattern in accordance herewith formed of squares, hexagons, and irregular pentagons, and having a form generally appropriate for a ship's storage tank;

FIG. 5 illustrates a pattern composed of dodecagons surrounded by 12 trapezoids;

FIG. 6 illustrates a pattern composed of a hexadecagon surrounded by two rows of trapezoids;

FIG. 7 illustrates in perspective showing the interior arrangement of the plane partitions of a structure in accordance herewith and formed corresponding to the pattern of FIG. 1;

FIG. 8 illustrates in perspective the outer enveloping surface of a structure in accordance with FIG. 7;

FIG. 9 is an exploded view of one of the top or corner cells of a structure according to FIG. 7, showing the formation of all the spherical arches or vaults by means of only two elements;

FIG. 10 is a perspective showing of one of the top or corner cells having the form an equidomoid with a square base, instead of spherical surfaces;

FIG. 11 is a perspective showing of the interior arrangement of the plane partitions of an equidomoidal structure comprising the cells as shown in FIG. 10;

FIG. 12 is a perspective showing of the outer envelope or surface of a structure according to FIG. 11;

FIG. 13 shows in perspective a structure having interior partitions replaced by tie bars or hollow tubes;

FIG. 14 is a view in section through a structure constructed according to the pattern or carrelage of FIG. 5;

FIGS. 15 and 16 are, respectively, axial and transverse sections (as indicated by section lines XVI—XVI and XV—XV through a structure in the form of a torus and constructed to embody a carrelage or pattern analogous to that shown in FIG. 2;

FIGS. 17 and 18 are, respectively, a plan view and a vertical sectional view (along the line XVIII—XVIII of FIG. 17) of a structure in the form of a sphere;

FIGS. 19 and 20 are sectional views through a structure formed with a carrelage or pattern analagous to that of FIG. 6 and combining four spheres, with FIG. 20 being taken on the line XX—XX of FIGS. 19 and 30;

FIG. 21, like FIG. 7, is a perspective showing of the arrangement of plane partitions in another structure corresponding generally to the pattern of FIG. 1;

FIG. 22, somewhat like FIG. 8, is a perspective showing of the outer surface or envelopes of a structure according to FIG. 21;

FIG. 23, somewhat like FIG. 9, is an exploded view of one of the top or corner cells of a structure in accordance with FIG. 21;

FIG. 24, somewhat like FIG. 10, is a perspective showing of one top or corner cell comprising surfaces of an equidomoid on a square base (instead of spherical surfaces) for a structure according to FIGS. 21 and 22;

FIG. 25 is a vertical section through another structure arranged in accordance with the pattern of FIG. 6;

FIG. 26, somewhat like FIG. 13, is a perspective showing of a structure in which internal partitions are replaced by tie bars or hollow tubes;

FIG. 27 is a perspective showing of several different illustrative means for affixing such tie bars or hollow tubes together;

FIGS. 28 and 29, somewhat like FIGS. 15 and 16, are, respectively, axial and transverse sections (as indicated by section lines XXIX—XXIX and XXVIII—XXVIII) through another structure in the form of a torus;

FIG. 30, somewhat like FIG. 19, illustrates another structure formed with a pattern somewhat analagous to that of FIG. 6, and with a transverse section (along the line XX—XX) as shown in FIG. 20;

FIG. 31 is a perspective showing of a structure in which internal partitions have been replaced by posts, tie bars, and/or arches; and FIG. 32 illustrates such tie bars, arches, etc., at the outer surface of a structure in accordance with FIG. 31.

In considering the drawings and other disclosure hereof, it is important to understand that, in addition to the pattern or carrelage on a normal section through the structures here, they are also defined spatially by a repeated disposition, of whatever the number, of slices or sections each included between two parallel and facing normal sections and comprising, in each slice or layer, polyhedrons which can be inscribed within spheres and have a plane face or surface in each normal section, which face is formed by one of the polygons (of the above noted carrelage or pattern) which are inscribable in a circle. The face of each lateral polyhedron which corresponds to one free side of a polygon in the normal section or carrelage (i.e., a side which is not in common with another polygon) forms a portion of a spherical surface, in the form of an arch or dome or vault, with such sphere passing through the corner or apex of the free sides of two polygons in the normal sections. At the same time, the face of each corner polyhedron which corresponds to two free sides of a polygon in the normal section is formed as a portion of a spherical surface, which sphere intersects the tops or corners of the free sides of two polygons in the normal sections. At each extremity beyond the normal section, the polygons of that normal section define likewise spherical vaults or domes and portions of spherical surfaces for the lateral polygons and the corner polygons.

In addition to the foregoing, arrangements in accordance herewith are also defined or explained by the internal construction or assembly of plane partitions forming the faces of the polyhedrons mentioned above and by the system or ensemble of spherical surfaces forming the envelope or outer surface. Such plane partitions are most readily considered as resulting from the intersection of spheres two-by-two, real or imaginary, circumscribing the polyhedrons, so that these partitions are precisely determined in number and in position, and any adding or subtracting of the partitions may desrtoy the equilibrium of the whole system and diminish the utility thereof. The manner of determining the precise thicknesses and curvatures of the various surfaces will be described in more detail below.

Generally, in accordance herewith, the above-noted spherical surfaces can be replaced by other curved surfaces analogous to spherical ones, as set forth in more detail below, and the plane partitions can be replaced, wholly or partly, by tie bars or hollow tubes or arches disposed in the plane of each of the partitions or at the intersection of two of them in particular sections. Similarly, some of the partitions or tie bars or hollow tubes can be extended to the exterior of the envelope or outer surface of the structure for fixing or supporting the structure itself and the contents thereof.

Two boundary cases (in the mathematical meaning of the term) of such geometric structures are readily explained in accordance with this invention. Of these two boundary cases one eliminates the extreme edges or layer of spheres constituting two opposite faces of the structure, and the other, by contrast, utilizes such extreme spheres. That is, there was discussed above the edges of polyhedrons disposed between two parallel normal sections, i.e., between two planes the intersection of which is defined as being infinity. This intersection can, however, also be considered as occurring at a finite distance, with the normal sections thus being axial sections and the edges becoming or forming a mitre-type arrangement. The apex angle of each mitre is the quotient of 360° divided by the number of mitres, and the arrangement then is formed into a torus, and at the bounary of a sphere, eliminates the spherical surfaces of the two extreme ends.

Conversely, it is possible to consider that a slice of spheres (i.e., a transverse slice of a structure such as described above) is separated into half slices of hemispherical shape spaced one from the other and may be joined by portions of circular cylinders joined tangentially to those spheres the equatorial great circles of which form the bases of the cylinders and constituting the envelope or outer lateral surface of the structure. On the other hand, such half slices may be joined by prisms joining and extending those of the plane faces of the polyhedrons which are normal to the plane of the section. Such an arrangement remains aplexic as desride, but its presents a discontinuity of transverse section in the plane of the two separations, and, in effect, the longitudinal tensions of the envelopes or outer skin and the internal partitions of the cylindrical system are the same as for the envelopes and the partitions of spheres. The transverse tensions of these elements are doubled in the case of a cylinder because of such discontinuity. As a result, from one part to another of the transverse connecting sections the thicknesses will vary equally from simple to double. At the two extremities, the spherical arches and spherical surfaces continue unchanged if it is only these spherical surfaces (on the sides and at the tops or corners), which join tangentially circular cylinders.

In this last hypothesis, it is necessary that the centers of the spheres be placed in the same transverse plane, thus to permit the tangential joining of hemispheres to cylinders without an intervening spherical-cylindrical section which is not a plane curve. Finally, the transverse partitions created by the intersections of successive spheres disappear entirely, returning the cellular system to only two dimensions, thus destroying the aplexic condition in the cylindrical region and tending to permit ruptures as a result of abnormal tensions or forces. Also, in certain cases, for example in the case of structures of a generally cylindrical form where it is desired to increase the width of the interior polyhedrons, arrangements in accordance herewith may be considered in terms of the intersection of several spheres three-by-three, and, in such cases, the intersecting partitions pass through the radical axis, which concentrates the forces, and the inscribed polygons are truncated, but, the polyhedrons still being inscribable in the spheres, the rearrangement of the forces and calculations of the thicknesses are still valid. In the following discussion, the foregoing will be explained in more detail with specific examples (see, for example, the arrangements of FIGS. 19 or 30) and substantially the same considerations apply in the case of structures having exterior surfaces which are generally cylindrical.

Figure 3:
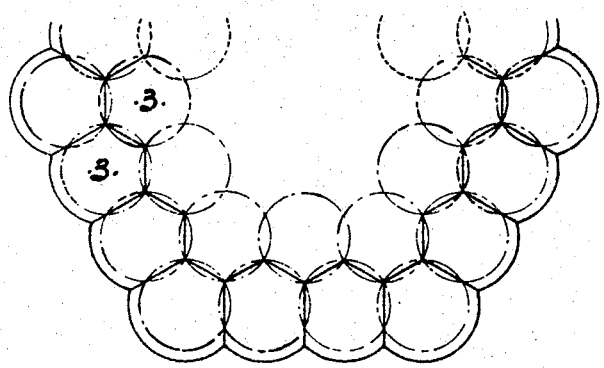
FIG. 3 illustrates another pattern or carrelage comprising a plurality of hexagons and having a generally hexagonal form.

As further illustrative of this invention, there will now be described several specific structures and/or the sectional patterns therefor with which satisfactory results are achieved in accordance with this invention, and as purely illustrative of various structures embodying and for practising this invention. For example, referring more particularly to the drawings, FIG. 1 illustrates a carrelage or pattern of polygons in a normal section of a container or other enclosure in accordance herewith, and with this particular pattern being formed of a plurality of squares and with the whole pattern having a generally rectangular form. FIG. 2 represents a pattern composed of rectangles 2, which pattern itself is also of generally rectangular form. FIG. 3 illustrates another pattern composed of hexagons 3, with the pattern having itself generally a hexagonal form, and one should note that a hexagon is the particular polygon which permits welding in the most simple fashion because an assemblage of hexagons involves triple welds.

In FIG. 4 there is shown a pattern composed of squares 1, hexagons 3, and irregular pentagons 4, which are, nevertheless, inscribable within a circle as indicated by the dotted lines in the drawing. The entire pattern has the general form useful for ship or vessel with inclined inner walls of which the successive transverse sections along the hull are indicated by the dot-dash lines 5, with the deck indicated at 6. FIG. 5 shows a pattern composed of a regular dodecagon 7 surrounded by a circular ring of 12 trapezoids 8, while FIG. 6 illustrates a pattern composed in a similar fashion with a regular hexadecagon 7 surrounded by two rows of trapezoids 8 and 9, each of which is inscribable in a circle, and with the general form of both the patterns of FIGS. 5 and 6 being substantially circular. As will be apparent from the foregoing, a variety of other patterns or carrelages are readily visualized and formed to define structures embodying and for practising this invention and along the same lines with each pattern being perfectly or completely composed of polygons which are inscribable within a circle.

Further, as already explained, in addition to the carrelages or patterns, such as described above, a multicellular structure in accordance with this invention is also defined according to a repeated disposition of a number of slices or layers each included between two parallel normal sections having the same carrelage or pattern. As an aid to clarity of description, one may refer illustratively to an assembly of cubic polyhedrons ABCBA'B'C'C' such as are shown in FIGS. 7 and 8, with FIG. 7 showing the assembly including plane internal partitions (without an outer covering or envelope) and FIG. 8 showing the outer envelope or surface layer. These showings indicate that the outer surface or envelope includes spherical arches or domes or vaults 22 for the polyhedrons $A_1B_1C_1D_1A'_1B'_1C'_1D'_1$ disposed on one face or outer surface of the generally rectangular mass of the structure, while also including spherical arches or domes 25 for the polyhedrons $A_2B_2C_2D_2A'_2B'_2C'_2D'_2$ disposed on another face or point of the structure, and spherical arches or domes 27 for the polyhedrons $A_3B_3C_3D_3A'_3B'_3C'_3D'_3$ disposed at a top corner of the structure.

A particular advantage in accordance herewith may be noted from the foregoing that arches or vaults 25 or 27 at the edges or corners of the structure can readily be obtained merely by the assemblage of only two types of structural elements, which are identical with elements of the spherical vaults or arches 22 on the faces of the structure and with identical spherical mitre type joints between them. This may be more apparent by reference to FIG. 9 in which an exploded showing is indicated of an assembly of one of the arches or vaults 27 in FIG. 8, from which drawing it is immediately apparent that this vault 27 is sub-divided by circles O and is formed of three spherical vaults 22', 22", and 22''', identical among themselves and with vault 22 of FIG. 8, and the three spherical joint elements 28', 28" and 28''' are also identical with each other and with the spherical vault 25 of FIG. 8, which is composed of two arches 22' and 22" and a single spherical joint element 28'. Thus, all the spherical surface portions of vaults 25 and 27 can be readily obtained simply by the assembly of elements of only the two types 22 and 28. Furthermore, the surface spherical vaults 22 and the mitre-elements 28 are component parts of relatively low height, and thus are easy to produce in quantity by simple stamping or similar forming techniques.

As noted above, the invention contemplates and includes situations where these various spherical surface portions are replaced with other non-spherical curved surfaces, like spherical surfaces but not necessarily precisely spherical, although aplexic or quasi-aplexic. Among such other curvatures may be noted surfaces the curvature of which is for at least a minor portion thereof ellipsoid, paraboloid, etc., as well as other surfaces which, although they may not have an absolutely constant mean curvature, still provide sufficiently aplexic properties to the structures, somewhat analagous to the example suggested by a soap bubble fixed on a rigid support and subjected to interior pressure. In this class of surfaces which are sufficiently aplexic for satisfactory results here, although not precisely spherical, may also be included the equidomoids—i.e., surfaces of solids common to several right-angle cylinders with circular bases of the same diameter and arranged with the axes thereof arranged to be both concurrent and coplanar.

Thus, FIG. 10 shows an example of such a configuration as a regular equidomoid in which the axes of the cylinders are perpendicular, and such an equidomoidal surface can satisfactorily replace in accordance herewith one of the spherical cells of FIG. 9, particularly at the top or corner. The intersections such as arcs AC or BD of surface 31 may satisfactorily be reinforced in the respective planes thereof by a flat segment otherwise attached to the internal structure, and it should be noted that the three equidomoidal vaults or arches are identical and each composed of eight identical pieces 32, which, moreover, are formed quite simply by mere rolling operations.

As will be apparent from the foregoing, the corner cells have two vaults 31, and the cells on the face or lateral surfaces of the structure have a single vault 31, just as with the spherical forms previously described, and with the same advantages. It may be noted that the utilization of such equidomoidal surfaces having a constant mean curvature permits eliminating, for example in FIG. 7, the circular arc mitre elements adjacent the internal partitions by adapting directly the vaults on the straight sections of larger cells, as is shown in perspective in FIG. 11 (somewhat like FIG. 7), while FIG. 12 (somewhat like FIG. 8) shows in perspective the outer envelope or skin for the corresponding structure.

It should be noted that, with all the surfaces described above, the aplexic condition and uniform stress are virtually completely realized. The thicknesses of the spherical surfaces and plane partitions are respectively proportional to the radii of the spheres (actual or figurative) and to the distance between centers of the spheres where the plane partition forms an intersection, and, consequently, under the influence of either interior or exterior pressure, the total structure is deformed homothetically within itself. As will be apparent, an important advantage of such a structure is that, for a given volume, it is virtually if not identically the same weight as a single sphere, but with wall thicknesses much less and manufactured from structural elements much easier to obtain and with a general form much easier to put up in all models and places where needed.

Another important advantage of structures embodying this invention is that the presence of plane partitions—transverse, longitudinal, and horizontal—confers on the finished structure a great rigidity in all directions. For certain applications, at least some of these partitions may be extended to outside the exterior envelope for the purpose to serving to support the finished structure and the contents thereof and to transmit the total weight thereof to the foundation or sub-structure. Such an arrangement will be described below (particularly in connection with FIGS. 24 and 25), but it should be noted here that such extensions also can assure the retention of a reservoir or storage tank, for example, in the hold of a ship in case of a flooded hold or the support thereof on the inner walls of a ship hold. Similarly, the use of spherical vaults permits obtaining rather large open dihedral angles on the intersections of the various partitions, which considerably facilitates the job of welding or otherwise assembling the structural elements together into the desired finished multicellular structure. If desired, as will be understood, the equalization of interior pressures is readily accomplished, either by openings provided in the internal partitions or by exterior piping as the circumstances may indicate or warrant.

It is also to be considered as within this invention for achieving of satisfactory results in accordance herewith to replace, partially or totally, the internal plane partitions with tie bars or hollow tubes or arches, in a fashion suggested, for example, in the various prior patents and copending application noted above. As illustratively, FIG. 15 shows tie bars or hollow tubes placed, preferably, at the points where the internal partitions would intersect, and in a manner to provide the desired aplexic condition. Such assemblies have the advantage of providing greater open spaces and to avoid continuous interior walls, but the weight of such tie bars or even hollow tubes is greater than structures utilizing the internal partitions, for the same strength, because the tie bars work only in one direction, while the continuous partitions work in two directions for the same weight of metal for providing internal strength and rigidity.

According to the invention, it is thus possible to maintain, with the plane partitions, a single system of parallel planes and a single system of perpedicular tie bars in these planes, with the tie bars being themselves demountable, so that the invention also provides a solution particularly appropriate for producing lightweight storage reservoirs of relatively small capacity and various shapes with a minimum amount of dead weight.

Preferably, the overall structure should not come to a peak or apex. For example, as has been noted in connection with FIG. 5 showing a pattern composed of one regular dodecagon 7 surrounded by a circular ring of twelve trapezoids 8, the resulting structure corresponds approximately to the showing of a section of FIG. 14. As will be apparent from comparing these illustrations, each extremity of the complete structure comprises a spherical surface 37 of greater radius than the other spherical surfaces 38. In such an arrangement and in accordance herewith, satisfactory results are achieved by arranging the centers of such spheres in the same plane (as shown in the drawing), or to arrange the centers of the larger spheres 37 outside the plane of the centers of the smaller spheres 38, and, in the latter case, the intersections of the spheres with each other produce plane curves, but the plane partitions form polyhedrons with oblique faces as will be described in more detail below. A structure in accordance with this invention and following FIG. 14, as will be understood, includes no peaks or apices, and only contains spherical vaults or arches in the corner or top face at 38, which latter can also be assembled from only two elements of the spherical joints as above described.

As noted above, the invention is also to be considered as including, instead of slices of polyhedrons enclosed between two normal sections in parallel planes, sections or slices of polyhedrons enclosed between two planes which intersect a single axis placed at a finite distance and in common with all sections. The normal sections become, thus, axial sections, the slices become mitred, and the assembly thus is formed into a torus. As will be understood, a torus is not always an aplexic surface arrangement, but a torus thus constituted from spherical elements is generally aplexic. Such a torus is illustrated in partial axial section in FIG. 15 and in partial normal section in FIG. 16, in which drawings the axis of the torus is X—X. As is apparent from FIG. 15, this torus is derived from a pattern of rectangles analagous to that of FIG. 2.

Considering the construction of space stations in dynamic equilibrium on an orbit around the earth and designed to serve as relay points for space vehicles, it may be necessary to provide at such space stations the equivalent of a certain intrinsic force of gravity to correct the state of weightlessness, and such is contemplated in accordance herewith in the construction of toruses of large diameter turning or spinning around their own axes of symmetry so as to produce a gravitational field by centripetal acceleration. When one realizes the enormous expenditure of energy which is necessary to put into orbit each ton of a space vehicle, the economies of weight accorded hereby become of significance. Thus, the hull of such an orbiting space torus must be able to resist the uniform interior pressure of approximately atmospheric with a good general resistance to deformations. Calculations of a classical closed or pressurized hull arrangement give, for a torus having a cross section of ten meters in diameter, a thickness of about 4 mm., or about one ton per peripheral running meter; but such classical torus would have virtually no resistance to deformation and it would have to be strongly reinforced in a manner to multiply its weight several times to give, for an arrangement of 40 meters in diameter, a weight of perhaps in the neighborhood of 480 tons. By contrast, a toroidal space station according to this invention and of substantially the same dimensions includes associated spherical elements having a total weight, including the internal partitions, substantially less—perhaps only three-quarters the theoretical weight of a classical torus or about 180 tons less. Furthermore, the weight of such a toroidal arrangement according to the invention includes the internal partitions as described and which assure the structure great general resistance to deformation.

Considering further such a structure in accordance herewith with a common axis for all the sections, then the torus becomes a sphere. Such a sphere is illustrated in plan view by FIG. 17 and in vertical axial section in FIG. 18. As will be noted, such a structure comprises a polyhedron having surface planes 43 and surrounded by peripheral cells 44. As illustrated, and according to the features hereof already described, certain of the internal partitions are elongated outside the envelope, as noted in 45, where the extensions contact and rest upon pillars 46 of the supporting sub-structure.

As will be apparent regarding such spheres with multicellular spherical walls, it is possible in accordance with this invention to build reservoirs or storage tanks of a general spherical form but with dimensions considerably larger than those permitted by known techniques. For example, following known techniques, the diameter of such storage reservoirs is generally limited by the possibilities of forming and assembling the various sheet metal pieces which must have a relatively large thickness, at least as a practical matter. By contrast, with a spherical structure according to this invention, the thickness of the various sheet metal pieces is not dependent upon the size or dimensions of the ultimate enclosure, but can be chosen as small as desired because of the multicellular construction. Furthermore, such a structure according to this invention, particularly with storage tanks and the like, permits the simple utilization of an interior or framework of plane partitions of extreme rigidity, participating in the aplexic contractions and expansion of the whole assembly, and the total weight of such a structure, including both the outer wall and internal partitions, is approximately equal or, at least, not substantially greater than the weight of a simple spherical tank of the same volume. The inherent rigidity of the internal partitions also provides the advantage of supporting the entire structure thereby in excellent manner without interfering the curved surfaces as in the conventional technique with spherical storage tanks.

Also, a variety of spherical structures according to the invention can conveniently and satisfactorily be combined into a single arrangement, for example, by arranging the spherical elements in a fashion such that they are two-by-two in common with one face of the interior polyhedron. FIGS. 19 and 20 illustrate, in this connection and as purely illustrative, the combination of four spheres, with the drawing showing a section along the axis X—X passing through the centers of the spheres and, in FIG. 20, a section normal to such axis along the line XX—XX. Each of these spherical elements is developed following a carrelage or pattern analagous to that described above in connection with FIG. 6, as indicated by the polyhedrons 48 and 49 with oblique faces. It is to be noted that the number of interior transverse partitions is diminished (with, of course, increase in the thicknesses of those remaining), which may provide advantages in certain cases. For example, such a structure or elongated assembly has been found to provide substantial resistance to high external uniform pressures, as being strongly reinforced in all directions, and conforms in the best manner to the pressure resistance and lightness required of the hull of a submarine adapted for operation at substantial depths and in which the exterior hull is schematically indicated at 50, with the multicellular arrangement forming an inner wall thereof.

Since such inner structure is designed, in accordance herewith, to be thoroughly aplexic under uniform pressure, it is particularly adapted to this type of construction. Furthermore, another substantial advantage is that such principle of construction enormously facilitates the calculations or designing for resistance to pressure as well as to fire. Plane internal partitions result from the intersections of the peripheral spheres with the central spheres, and the fire resistance of the assembly is favored by the compartmentation resulting from the partitioning of all the surfaces. On the other hand, it is only the large partitions separating the interior polyhedrates which have an insufficient strength for resisting fire, and it is quite possible to augment such resistance, without increasing the weight of the partitions, by forming each partition of two layers of half thickness as a polyhedric lens or lentil form 51.

In addition to the toroidal and spherical arrangements described above, there is also provided in accordance with this invention an arrangement of a slice or section of spheres circumscribed around polyhedrons and separated into two hemispherical arrangements spaced one from the other, yet one overlying the other at least in part in portions of circular cylinders having for the bases thereof the equatorial great circles of spheres which join them tangentially and, on the oher hand, by prisms which are joined and elongated from the faces of the polyhedrons which are normal to the plane of the section through the arrangement. Comparing such structures to the ones previously described as illustrated, for example, in FIGS. 7 and 8, one may note that the end surfaces remain unchanged, the lateral surfaces are replaced by cylindrical surfaces, the internal longitudinal partitions remain unchanged, and the internal transverse partitions disappear. Such a structure is illustrated by FIGS. 21 and 22 in a form somewhat like the showings of FIGS. 7 and 8.

As will be understood, there is still found in such structure the same advantage of forming the entire device from only two spherical surface elements 22 and 28. As noted in FIG. 23, for example, which is an exploded view of the assembly corresponding to dome or vault 65 of FIG. 22, this dome or vault 65 is composed of element 22', identical with element 22 of FIG. 9, and two elements 67 and 67' identical with half of element 22 in FIG. 9, and of two joining elements 28' and 28" identical with the corresponding joining elements 28 in FIG. 9, and a further mitre element 68 identical with half of element 28. In the same manner, the spherical vault or dome 61 in FIG. 22 is composed of element 22' identical to element 22, one element 67' identical to half of element 22, and a joining element 28' identical with element 28 in FIG. 9.

The respective thicknesses of the spheres, the cylinders, and the plane partitions are proportional to half the radii of the spheres, to the radii of the cylinders, and to the distance from the axis of the cylinders to the point at which the plane partitions make intersections. The thickness of the spherical vaults or domes is, thus, half the thickness of the cylinders which join them tangentially along an equatorial arc.

As will be understood from the foregoing, and because of the aplexic condition and the thickness distribution rule disclosed above, the total weight of such a structure in accordance herewith is virtually or exactly the same as that of a single cylinder containing the same volumetric capacity at the same pressure and affording the same ratio between the diameter of the spherical parts and the length of the cylindrical parts. With respect to a sphere (although such diameter/length ratio is zero), the cylinder weighs 33% more, and, with such ratio at 5 (which is a current value in designing), the increase in weight is of the order of 30% to 40% providing there is applied to the spherical domes either the theoretical thickness or double that. On the oher hand, structures according to the invention comprise three sets of partitions for the outer surfaces or envelopes consisting only of spherical domes or vaults and two sets of partitions (but of double the thickness) for the outer surfaces consisting of parts of cylinders—for a total effective weight of the order of three to four. As already noted, the spherical domes can be replaced by quadrilateral surfaces or other surfaces analogous to spherical ones. FIG. 24, for example, shows a corner or apex cell in the form of an equidomoid with a square base, corresponding somewhat with FIG. 10 or FIG. 23, with the same advantages and ease of fabrication, etc., as already described in connection therewith.

In this construction, also, satisfactory results are obtained if the spheres are not all equal, as that shown in FIG. 25 (which is generally like FIG. 6), as in FIG. 14 already described, and FIG. 5, with respect to all of which the remarks above are here applicable. Similarly, as with previously described constructions, the plane partitions can be replaced, wholly or partially, by tie bars or hollow tubes 53 or arches (FIG. 26), and such alternative structures have a cross section equal to the replaced partitions and correspond to and are disposed along the lines of intersection thereamong and with the curved surfaces. The connection of the intersections of the opposed lateral cylinders is effected by the introduction of transverse tie bars as conveniently calculated, and the assembly thus becomes a system analogous to a tubular scaffolding structure, but one in which the elements which form the profiles or the tubes are under traction. FIG. 27 shows various possible dispositions and connections for the intersections of the tie bars.

As noted in the foregoing, several arrangements of structures according to this invention can be combined. For example, FIGS. 28 and 29 illustrate a torus formed from a plurality of toruses and constructed on substantially the same carrelage or pattern as the torus illustrated in FIGS. 15 and 16, although the utilization of two toruses means that a completely aplexic condition is only approached. As another example, FIG. 30 illustrates a combination of a sphere, separated into two hemispheres, joined by a multiple cylinder, and this structure is developed on a pattern similar to FIG. 6, as is the structure illustrated in FIG. 19. The analogy between these two structures may be noted here as well as that the other comments above regarding FIG. 19 also apply here.

As is also apparent from the foregoing, structures in accordance herewith can be placed in all positions, the intersections of the plane partitions being either vertical or horizontal, for example. Thus, in the case of a storage tank, the vertical positioning of these intersections favors the efficient transmitting to the sub-structure or foundation of the effects of gravity on the reservoir and the contents thereof. Similarly, equalizing the pressure between different cells is readily assured, for example by openings in the partitions or by external piping. In structures having three systems of orthogonal partitions, such pressure openings are preferably provided with diminishing cross sections from the periphery toward the center, in which fashion, in the case of accidental fire, a decrease of pressure is progressively obtained so that it loses its explosive character, and in a manner which also tends to a further advantage of this invention.

As will also be understood, the structures in accordance with this invention are satisfactorily formed of metallic material (steel or light metals), of synthetic plastics which may be reinforced or provided in multilayer form, reinforced concrete, impermeable fabric or textiles, etc. One should note, in the latter case, that the invention achieves the construction of large capacity structures with textile models or materials, and the internal connections are formed by tie bars which may also be formed as cables of textile materials.

The actual assembly of the plane internal partitions with respect to each other and to the outer envelope is satisfactorily accomplished in a variety of known manners, for example by welding for metallic or plastic materials, etc., as well as other well known construction techniques for assembling metal structures. For example, manholes are readily provided in the internal plane partitions for access to different cells. Even where the cells are too small to accommodate a man, the entire system can be formed in a manner which renders it demountable according to known procedures of metallic construction, for example by bolting. For the spherical domes or vaults of the outer skin or envelope which must be water-tight, satisfactory results are obtained by utilizing the well known system of closing or of fastening as utilized with autoclaves or other pressure vessels.

As will be understood, in those situations where structures in accordance with this invention are to be utilized in contact with a medium at very high or very low temperatures (for example, as a storage tank for liquefied gases), the outer skin or envelope is advantageously provided, on the exterior or interior thereof, with a layer of insulating material, and one should note that the replacement of plane internal partitions by hollow tubes permits guarding the entire structure from the effects of very high or very low temperatures by placing insulating material between the structure and the high or low temperature medium in contact therewith.

Also as will be understood from the foregoing, structures in accordance with this invention are satisfactorily capable of supporting interior pressures as well as exterior pressures, since the forces incident thereto are substantially the same, although acting in opposite directions. Such structures also conveniently provide fire resistance as already indicated. Such advantages suggest the satisfactory use of these structures as submarines, even for navigation at great depths, as described in connection with FIGS. 19, 20, and 30 above.

In the particular illustrative case of transporting or storage of liquefied fluids at moderate pressures but very low temperatures, for example in the case of liquefied methane or ethylene, an appropriate reservoir should include the following conditions: It must resist an interior vapor pressure which is in this case generally fairly high; it must resist interior underpressure of perhaps 80% in order to permit effective draining of the liquefied gaseous content as completely as possible; and it must support or resist contractions or expansions due to variations in temperature which may exist in different parts of the storage tank, particularly at the moment of first refrigeration thereof. In such situations, the multicellular reservoir structures in accordance herewith, particularly with the internal partitions replaced by uprights or tie bars or hollow tubes and arches, give especially satisfactory results in such cases of storing liquefied gases because, particularly at low pressures, the partitioned structures have such small thicknesses as not to perform optimumly if welded, and otherwise may not offer a sufficient resistance to internal underpressure. If, on the contrary, the metal on the corners or intersections of the plane partitions and the spherical surfaces is concentrated into a thin armature or framework (as is the case utilizing tie bars instead of complete partitions), a structure is developed which is readily welded and which develops a substantial transversal internal resistance to compressive forces.

The general form of such structures is illustratively indicated in FIGS. 31 and 32, and includes the supports 71 and relatively thin arches 72, with an outer envelope or skin 73. Preferably the supports 71 are formed with a cruciform profile of which the total cross section is substantially equal to the partitions which they replace, with the wings of this profile being extended in the form of arcs or arches 72 which support spherical surfaces 73, although this particular structural form of profile is not to be considered as limiting in connection herewith. As previously noted, FIG. 27 illustrates the satisfactory examples of interconnecting such supports in square or cylindrical sections and in a manner in which the supports are readily welded together. Satisfactory results are also achieved in accordance herewith, as will be understood, by bolting or riveting as at 74 in FIG. 27.

The weight of the internal structure of reservoirs or storage tanks thus fabricated in accordance herewith is perhaps double that of a structure with internal plane partitions because the internal supports work or stress the metal in only one direction, whereas a continuous partition provides tensile or compressive rigidity in two directions. Nevertheless, in this case, the weight, which is proportional to the surface pressure, is still acceptable because of the low value of the pressure. By contrast, the gain in inertia or stability is considerable and assures the transmitting of force on the arches and uprights as a result of collapsing forces exerted on the spherical vaults or domes. Thus, with the assurance that such elements will not burn, on the one hand, and that the rate of compression thereof does not go beyond an acceptable limit, satisfactory results are achieved in accordance herewith. The concentration of metal on such supports and arches gives rise to these two advantages.

Such a construction of storage tanks or reservoirs in accordance herewith and in which the partitions are replaced by interior supports or arches sustaining the outer skin or envelop is particularly applicable to storage tanks or reservoir containers comprising external surfaces reinforced by cylindrical curves and spherical curves as represented by FIG. 26 which produce assemblies having generally the exterior form of FIG. 22. The rectangular internal supports are the same as those defined in an assembly with spherical cones or vaults, and the arches are similarly situated on the surfaces forming the spheres. On the other hand, the intersections of exterior cylinders with each other are provided by beams or side members which accommodate, on the one hand, the action of the extension walls or shell and, on the other hand, the action of the transverse interior supports. Such an arrangement is already disclosed in U.S. Patent 3,004,509 and 3,092,063 noted above, but the incorporation in a system of spherical vaults as here disclosed has the advantage of determining exactly the placement and dimensions of the interlocking system of interior supports. Such beams are calculated to provide flexing between two upright supports under the effective pressure or under pressure.

As will be apparent from the foregoing, useful applications of structures embodying and for practicing this invention are quite numerous, in addition to those specifically suggested in the foregoing parts of this disclosure. As purely illustrative examples, as will be understood, such structures in accordance herewith achieve satisfactory results as reservoirs or storage tanks for fixed mounting to store gases or liquids, similar mobile reservoirs or storage tanks on land vehicles, ships, aeroplanes, etc., and particularly large transporting vessels for ships transporting liquifid gases. Similarly, structures in accordance herewith produce satisfactory results as used for envelopes or hulls for air travel, reservoirs or shells for aerial or space rockets, fuel storage anks, ship hulls, deep-sounding submarine hulls space vehicles such as the toroidal arrangements described above, etc. When used as reservoirs or storage tanks for containing fluids at very low temperatures, the structures in accordance herewith are readily constructed of high nickel steels, aluminum alloys, or even reinforced plastic materials. For containers or reservoirs for fluids at normal temperature, steel (because of its high elastic resistance), light metals, reinforced or prestressed concrete, and even certain textiles and fabrics are appropriate materials. In any event, the geometric configurations and explanations in the foregoing disclosure and in accordance with this invention are readily and appropriately applicable to any of the foregoing and other varieties of appropriate materials susceptible to normal or known reactions to interior and exterior forces.

While the particular forms and arrangements of structures as described herein form preferred embodiments of this invention, this invention is not limited to these particular forms or arrangements of structures, and changes may be made therein without departing from the scope of this invention which is defined in the appended claims.

What is claimed is:

1. A multicellular aplexic structure of the character described for forming containers, enclosures, and the like comprising a large plurality of hollow cells of various polyhedral shapes arranged in multiple rows and layers, the shapes and configurations and arrangements of said cells and said multiple layers and rows thereof being defined by:

(a) a normal section through said structure consisting of a perfect carrelage of polygons each of which is perfectly inscribable in a circle and all of which fit together to cover the entire area of said normal section without omission or overlapping;

(b) a layer of polyhedrons defined between two of said normal sections spaced apart but facing each other, each of said polyhedrons being perfectly inscribable in a sphere and having said polygons of said normal sections as the plane faces thereof which lie in each of said two normal sections;

(c) said multiple layers of said structure being layers as defined in (b) above, with the free faces of said polyhedrons in said multiple layer structure being curved surfaces with a substantially constant mean curvature;

and substantially all said cells as above defined and shaped and arranged being formed from an interior assembly of plane partitions comprising said plane faces of said polyhedrons and an outer shell comprising an assembly of said curved surfaces.

2. A multicellular aplexic structure as recited in claim 1 in which the thickness of said interior plane partitions are proportional to the distance thereof from the centers of said spheres within which said polyhedrons are inscribable and in which the thicknesses of said curved surfaces are proportional in the same ratio to the reciprocal of the mean curvatures of said curved surfaces.

3. A multicellular aplexic structure as recited in claim 1 in which the planes of said normal sections are substantially parallel whereby the overall shape of said entire structure is generally polyhedral.

4. A multicellular aplexic structure as recited in claim 1 in which the planes of said normal sections all intersect a common axis at a finite distance from said structure whereby the overall shape of said entire structure is that of any of a variety of toroidal shapes including a sphere as a limiting possibility.

5. A multicellular aplexic structure as recited in claim 1 in which at least one of said layers of said polyhedrons is separated into two half-layers of hemispheres with said half-layers being joined together (a) by portions of circular cylinders tangentially engaging spheres the equatorial great circles of which form the bases of said cylinders and with the curved surfaces of said cylinders forming the lateral curved portions of said outer shell of said structure, and (b) by prisms joining and extending those of the plane faces of said polyhedrons which are normal to the plane of said normal section defining said layer of polyhedrons.

6. A multicellular aplexic structure as recited in claim 1 in which said curved surfaces of said outer shall are spherical surfaces and portions of the surfaces of said spheres within which said polyhedrons are inscribable.

7. A multicellular aplexic structure as recited in claim 6 in which said curved surfaces of said shell are all formed of only two different sheet metal elements comprising a spherical vault element and a spherical mitre element.

8. A multicellular aplexic structure as recited in claim 1 in which said curved surfaces of said outer shell are portions of the surface of an equidomoid.

9. A multicellular aplexic structure as recited in claim 8 in which the curved surfaces of said shell are all formed by but a single sheet element comprising a segment of said equidomoidal surface.

10. A multicellular aplexic structure as recited in claim 1 in which at least a portion of said interior assembly of plane partitions is replaced by a series of tie bars arranged along the lines where said plane partitions would intersect in said structure.

11. A multicellular aplexic structure as recited in claim 10 in which said tie bars are combined with arch elements at the lines of intersection of said curved surfaces.

12. A multicellular aplexic structure as recited in claim 1 in which at least some of said interior plane partitions are extended to the exterior of said shell for forming means for supporting said structure.

13. A multicellular aplexic structure as recited in claim 10 in which at least some of said tie bars are extended to the exterior of said shell for forming means for supporting said structure.

14. A multicellular aplexic structure as recited in claim 1 in which a plurality of structures individually as recited in claim 1 and each having a plane face of said polyhedrons are combined into a single multiple structure joined together at said plane faces.

15. A multicellular aplexic structure as recited in claim 1 in which said interior plane partitions include openings therein for free communication among said cells within said structure.

16. A multicellular aplexic structure as recited in claim 15 in which said openings are formed of decreasing effective cross-sectional area from the periphery of said structure toward the center thereof.

17. A multicellular aplexic structure as recited in claim 1 in which said polygons forming said carrelage of said normal section each results and is defined by the intersection of three circles, with the apieces of said polygons all falling on said circles except one common apex which is situated at the radial center of said three circles.

References Cited

UNITED STATES PATENTS 2,457,118  12/1948  Boardman  220—1
2,818,191  12/1957  Arne  220—1

JAMES B. MARBERT, *Primary Examiner.*